United States Patent [19]

Borg et al.

[11] Patent Number: 4,628,479
[45] Date of Patent: Dec. 9, 1986

[54] TERMINAL WITH MEMORY WRITE PROTECTION

[75] Inventors: Arthur N. Borg, Lake Forest; Giora Bar-Hai, Oak Park, both of Ill.

[73] Assignee: Zenith Electronics Corporation, Glenview, Ill.

[21] Appl. No.: 646,275

[22] Filed: Aug. 30, 1984

[51] Int. Cl.⁴ ............................................. G06F 12/16
[52] U.S. Cl. ....................................................... 364/900
[58] Field of Search ... 364/200 MS File, 900 MS File

[56] References Cited

U.S. PATENT DOCUMENTS

| | | | |
|---|---|---|---|
| 3,599,177 | 8/1971 | Jen et al. | 364/900 |
| 4,017,840 | 4/1977 | Schild et al. | 364/200 |
| 4,245,308 | 1/1981 | Hirschman et al. | 364/200 |
| 4,412,294 | 10/1983 | Watts et al. | 364/900 X |
| 4,432,050 | 2/1984 | Harris et al. | 364/200 |
| 4,434,464 | 2/1984 | Suzuki et al. | 364/200 |
| 4,439,830 | 3/1984 | Chueh | 364/200 |
| 4,488,217 | 12/1984 | Binder et al. | 364/200 |

*Primary Examiner*—Thomas M. Heckler

[57] ABSTRACT

In a microprocessor-controlled video display terminal, coded data is used to represent characters and attributes associated therewith. Each attribute byte has associated therewith a designated control function such as underlining, inverse video, blanking, dimming, etc. If each attribute byte is comprised of M bits and there are N different attributes available for display, where M>N, then some of the bits comprising the attribute byte are not used. These unused bits are used in the present invention to represent a protected field in a character random access memory (RAM) for a given location, or address, on the video display and are read from an attribute RAM by the microprocessor for restricting access to the character RAM. In this manner, the writing of new data into selected portions of the video display is precluded.

14 Claims, 1 Drawing Figure

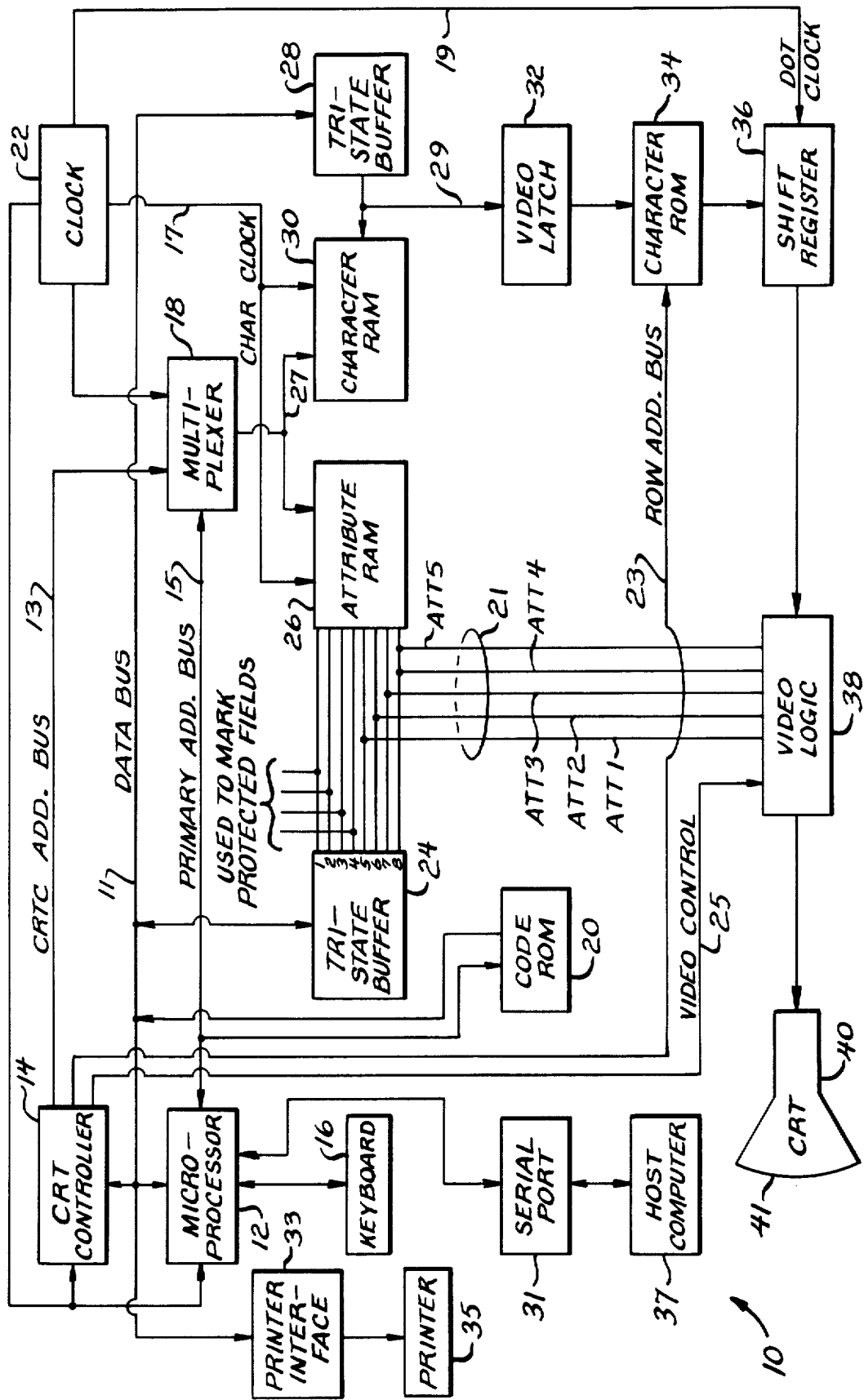

TERMINAL WITH MEMORY WRITE PROTECTION

BACKGROUND OF THE INVENTION

This invention relates generally to microprocessor-controlled video display terminals and is particularly directed to preserving information in memory for presentation on a video display device by limiting access to the memory location in which the information is stored.

In data processing systems it is frequently necessary to prevent data stored in a memory from being erased or altered. Various approaches have been implemented in order to prevent alteration of the memory contents. In one approach, an address register is provided with the address of a memory location to be accessed and additional registers are provided for respectively storing a boundary address and an address size associated with a program making the access. The stored boundary address represents the beginning address of a memory area accessible by the associated program and the stored size indicates the dimension or size of that memory area. In determining whether access to a given memory address is authorized, it is determined whether or not the memory address held by the address register is within the memory area specified by the boundary address and the size. If the address indicated by the address register exists in the memory area indicated by the boundary address and the size, access to that particular area of memory is permitted in accordance with the operating program. On the other hand, if the memory address exists outside the indicated memory area, memory address access is prohibited. This arrangement is called the segment scheme approach to preventing data in a memory from being erased or altered and requires various registers dedicated to holding the address of a memory location to be accessed as well as a boundary address and the size associated with the program making the access and hence increases the cost and complexity of the data processing system incorporating this capability.

Sometimes it is necessary or desirable to change the memory protection function in a data processing system. For example, it may be necessary to limit access to various portions of a memory depending upon the application in which the system is used. One example of such an application which readily comes to mind involves the field of word processing wherein pre-programmed forms may be filled in by an operator. In this situation, it is necessary to permit access to various portions of the memory for the entry of data in the blank spaces of the form, while preventing the revising of the form itself. With a capability to present and fill in various forms, those portions of the memory for which access was either authorized or unauthorized would change depending upon the form used. In prior art systems, a revision or expansion of the memory protection function has required a changing over of the operation mode of the entire data processing system by means of a control program capable of controlling system operation in the original as well as the new mode of operation and a program for changing over between these operation modes. This approach requires considerable program overhead and substantially increases programming costs as well as program storage requirements. In another approach, various "attributes" associated with control functions in the operation of the display, such as underlining, dimming, reverse video, etc., are used to designate protected areas in the video memory. This approach also is limited in that protected areas may not be changed without changing the attributes themselves.

U.S. Pat. No. 4,432,050 to Harris et al discloses a write protection arrangement for a data processing system wherein apparatus is provided for generating a write signal when the data processing unit is loading information into the control store of a storage device and for prohibiting use of the storage device's control store when such control store is being loaded with firmware words from the data processing unit. U.S. Pat. No. 4,434,464 to Suzuki et al similarly discloses a memory protection system for a computer wherein memory protection address information and operating program information are collated to determine whether access to a given memory area is to be allowed or inhibited. In addition, the memory protection information may be altered if it is determined that an instruction to be executed is an instruction having a predetermined operation and that an address of the memory to be accessed by the instruction is a particular address. Both of these approaches require considerable additional data processing system complexity and programming capability.

The present invention is intended to overcome the aforementioned limitations of the prior art by providing a memory protect feature in a microprocessor controlled video display terminal which makes use of existing system hardware, is easily implemented by merely expanding the number of coded instructions, and does not require modification of existing systems in providing a write protect capability therein.

OBJECTS OF THE INVENTION

Accordingly, it is an object of the present invention to provide write protection for the contents of select locations in a random access memory.

It is another object of the present invention to limit write access to predetermined locations in a video memory in a microprocessor controlled video display terminal.

A further object of the present invention is to limit access to select locations in a video display by means of an invisible write protect attribute in the form of a plurality of coded visible display attributes.

Still another object of the present invention is to provide a memory protection arrangement for use in a data processing system without increasing system complexity in the form of additional hardware or increased program overhead.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying FIGURE wherein is shown in block diagram form a system for providing a write protect memory capability in a microprocessor controlled video display terminal.

DETAILED DESCRIPTION OF THE PREFERRED EMBODIMENT

Referring to the FIGURE, there is shown in simplified block diagram form a write protect system 10 for use in a microprocessor controlled video display terminal. The write protect system 10 includes a microprocessor 12 to which is coupled a host computer 37 via a serial port 31 for providing control inputs to and receiving data from the microprocessor 12. In addition, the microprocessor 12 is coupled to an input device such as a keyboard 16. The keyboard 16 is responsive to operator initiated inputs for controlling the operation of the terminal. The write protect system 10 of the present invention contemplates the use of a conventional 8-bit microprocessor, but the concept of the present invention is equally applicable to any conventional microprocessor regardless of word length.

The microprocessor 12 is coupled to an attribute random access memory (RAM) 26 and a character RAM 30 via a primary address bus 15, an address multiplexer 18, and a secondary address bus 27. The microprocessor 12 is capable of either writing data into or reading data from the attribute and character RAMs 26, 30. Similarly, a cathode ray tube (CRT) controller 14 is coupled to the attribute and character RAMs 26, 30 via a CRTC address bus 13, the address multiplexer 18, and the secondary address bus 27. Unlike the microprocessor, the CRT controller 14 is only capable of providing addresses to the attribute and character RAMs 26, 30 so that video information may be read therefrom. The address multiplexer 18 operates under the control of a system clock 22 for performing a switching function in selectively coupling either the microprocessor 12 or the CRT controller 14 to the attribute and character RAMs 26, 30. The microprocessor 12 and the CRT controller 14 are similarly coupled to the system clock 22 for receiving timing signals therefrom during which the microprocessor and the CRT controller are alternately authorized to read or write, or merely write in the case of the CRT controller, addresses in the attribute and character RAMs.

The microprocessor 12 writes an attribute and a character address respectively into the attribute and character RAMs 26, 30 via the primary address bus 15, the address multiplexer 18, and the secondary address bus 27. Addresses within the attribute and character RAMs from which the microprocessor 12 reads either attribute or character information are provided to the attribute and character RAMs 26, 30 from the microprocessor 12 via the primary address bus 15. Each address provided from the microprocessor 12 via the primary address bus 15, the address multiplexer 18, and the secondary address bus 27 to the character RAM 30 corresponds to a predetermined location on the faceplate 41 of the CRT 40. Similarly, each address provided by the CRT controller 14 to the attribute RAM 26 has associated therewith a given attribute as programmed therein by the microprocessor 12.

Microprogrammed subroutines are stored in a coded read only memory (ROM) 20 from which coded instructions are read by the microprocessor 12. The microprocessor 12 then sequentially executes each of the coded instructions read from the code ROM 20 in exercising system control in accordance therewith. Addressed locations within the code ROM 20 are accessed by the microprocessor 12 via the primary address bus 15 and the coded instructions are read from the code ROM 20 by the microprocessor 12 via a data bus 11.

The microprocessor 12 reads or writes into the attribute and character RAMs 26, 30 to accommodate necessary system bookkeeping and to control the overall system operation through access to the aforementioned microprogrammed subroutines stored in the code ROM 20. The data is read from or written into the attribute and character RAMs 26, 30 by the microprocessor 12 via the data bus 11 and tri-state buffers 24 and 28, respectively. A system clock 22 not only provides timing signals to the microprocessor 12 and the CRT controller 14 as previously described, but also provides various timing signals to other components of the write protect system 10. However, only some of these timing signals are shown in the FIGURE for simplicity sake. Among the timing signals are a character clock signal provided from the system clock 22 to the attribute and character RAMs 26, 30 for the clocking of data written into and read from these random access memories in 8-bit bytes. In addition, a dot clock signal is provided from the system clock 22 to a shift register 36 as described below. As stated earlier, data is written into the attribute and character RAMs 26, 30 via a respective tri-state buffer 24, 28. In addition, data is read from the aforementioned random access memories via a respective one of the aforementioned tri-state buffers and is provided to the microprocessor 12 via the data bus 11, with the microprocessor 12 carrying out operations in accordance with the data thus received.

Data representing an individual character is read from the character RAM 30 under the control of the microprocessor 12 and is provided via the secondary data bus 29 to a video latch 32. The video latch 32 is an 8-bit latch which provides parallel in-parallel out processing of the bits received from the character RAM 30 in converting the stored contents thereof via the character ROM 34 into a signal form representing the actual dots, or pixels, on the faceplate 41 of the CRT 40 for the selective illumination thereof in displaying video information thereon. The CRT controller 14 generates a character RAM address signal and reads a byte representing 8 pixels on the CRT's screen 41 from the character RAM 30. Once each group of 8 pixels is displayed, the CRT controller 14 automatically, depending upon its initialization parameters, advances to the next byte describing the next group of pixels with this process continuing without interruption.

The control/data signals transmitted via the data bus 11 connecting the microprocessor 12 and the CRT controller 14 specifies such system parameters as CRT type, lines per screen to be displayed on the CRT, characters per line, and interrupt generation during the vertical sync interval. From the FIGURE, it can be seen that control and data signals are provided between the microprocessor 12 and the attribute and character RAMs 26, 30 as well as the CRT controller 14. Also shown coupled to the microprocessor 12 via the data bus 11 is the combination of a high speed printer 35 and a printer interface device 33, both of which may be conventional in design and operation, for providing a hard copy printout of data entered via keyboard 16 or received from the host computer 37 via the serial port 31 and presented on the CRT 40. The printer interface device 33 converts the data from the microprocessor 12 into drive signals for operating the printer 35.

The output of the character RAM 30 to the video latch 32 via the secondary data bus 29 is in the form of an 8-bit address for reading the contents of a character read only memory (ROM) 34 corresponding to a character to be displayed on the CRT 40. The character ROM 34 has the capacity for storing the dot matrix configuration for a given number of characters. The character ROM 34 thus provides the desired dot matrix configuration for the formation of an individual character to the shift register 36, with the individual bits shifted therein under the control of the dot clock signal provided thereto via a dot clock line 19 from the system clock 22. The video latch 32 holds the appropriate character ROM address while character data is read therefrom and provided to shift register 36. The character ROM 34 is further coupled to the CRT controller 14 via a row address bus 23 for receiving a row address corresponding to a given location on the faceplate 41 of the CRT 40 for displaying a matrix of dots corresponding to a character read from the character ROM 34. The shift register 36 provides the character and display location data read from the character ROM 34 to a video logic circuit 38 on a bit-by-bit basis under the control of the dot clock signal provided thereto. Also provided to the video logic unit 38 via a video control line 25 from the CRT controller 14 is a video control signal for coordinating and synchronizing the display of video information read from the character ROM 34 with the electron beam scanning of the faceplate 41 of the CRT 40.

Also provided to the video logic unit 38 from the attribute RAM 26 via attribute lines 21 is visual attribute data. This attribute data, as previously explained, is stored in the attribute RAM 26 and represents a plurality of control signals for the CRT 40 for effecting a select presentation thereon. Each attribute is in the form of an 8-bit word read from the attribute RAM 26 and provided to the video logic unit 38 via the ATT 1 through ATT 8 lines, although for simplicity sake only the ATT 1 through ATT 5 lines are shown in the FIGURE as will become apparent in the following discussion. In the present case, only 5 of the 8 attribute bits are used because the present invention is disclosed for use in a video display system which offers 5 different attributes. These attibutes are: character blinking, one-half intensity, character underlining, inverse video, and display blanking. Each of these attributes is represented by an 8-bit word provided to the video logic unit 38 for display in an individual character matrix on the faceplate 41 of the CRT 40. Shown in Table I is the composition of a typical byte stored in the attribute RAM 26 wherein a "1" represents assertion of a given attribute and a "0" represents the nonassertion, or absence, of an indicated attribute. From Table I, it can be seen that bits 6, 7 and 8 are not used in the present invention for displaying attribute information on the video display.

TABLE I

| 8 | 7 | 6 | 5 | 4 | 3 | 2 | 1 |
|---|---|---|---|---|---|---|---|
| 1 | 0 | 1 | 0 | 0 | 1 | 0 | 1 |
| PRO-TECTED FIELD ATTRIBUTE | | | BLANK | BLINK | REVERSE VIDEO | DIM | UNDER-LINE |

The present invention contemplates the use of those bits not utilized for attribute information for designating protected fields within the attribute RAM 26. While the present invention is disclosed in terms of 5 available display attributes with the remaining bits used to designate protected fields, it is not limited to this number of display attributes. The only requirement relating to the number of attributes employed in the present invention is that this number must be less than the total number of bits in a display attribute byte. Thus, the present invention could be implemented in a system employing as many as 7 display attributes where each attribute is in the form of an 8-bit word. Or, more generally, the concept of the present invention is applicable to a video display system characterized by attribute bytes m-bits in length and wherein are available no more than m−1 different display attributes. Thus, the present invention is compatible with virtually any number and combination of display attributes and attribute word lengths provided that not all bits of the attribute word are utilized for designating a given attribute.

With each attribute byte stored in the attribute RAM 26 and read therefrom via the tri-state buffer 24 and data bus 11 by the microprocessor 12, system operation under the control of the microprocessor 12 is responsive to the attribute data provided thereto. Thus, if the contents of bit locations 6, 7 and 8 in an attribute byte represent a protected field, the microprocessor 12 reads this information from the attribute RAM 26 and decides on whether or not to write information into a corresponding location in the character RAM 30. If the unused attribute bits represent a protected field, the microprocessor will be prevented from writing new data into a designated location in memory. With 3 bits available for protected field designation, $2^3$ various protected field codes are available. For example, if bits 6, 7 and 8 are each represented by a "1", this may be used to designate the highest priority protected field which will not be written over under any circumstances. However, if each of these bits is represented by a "0", this may be used to represent the lowest priority protected field which may be written over under all but one condition, e.g., if it is underlined. Between these two extremes various levels of priority may be assigned to the protected fields in the character RAM 30. It is in this manner that a given location on the faceplate 41 of the CRT 40 corresponding to a protected field in the character RAM 30 may be made impervious to a user input which might change the contents thereof.

As shown in Table II, only one bit in the attribute byte may be used to designate a protected field. For the attribute byte shown in Table II only the 8th bit is used in designating a protected field. Thus, unlike the case shown in Table I, this arrangement does not provide for a range of priorities for the protected fields. In Table II, a field is either protected or unprotected depending upon the state of bit 8 of the attribute byte. It should also be noted that the arrangement of the attribute byte shown in Table II includes the designation of invisible attributes such as a tab stop and a paragraph marker which may be designated as protected when desired. The tab stop provides for positioning of a cursor on the CRT's faceplate 41 at a predetermined location upon tab selection on the keyboard 16, while the paragraph marker attribute provides for paragraph-by-paragraph scrolling of text information presented on the CRT 40.

TABLE II

| 8 | 7 | 6 | 5 | 4 | 3 | 2 | 1 |
|---|---|---|---|---|---|---|---|
| 1 | 0 | 1 | 0 | 0 | 1 | 0 | 1 |
| PROTECTED FIELD | TAB STOP | PARA-GRAPH | BLANK | BLINK | REVERSE VIDEO | DIM | UNDER-LINE |

TABLE II-continued

| 8 | 7 | 6 | 5 | 4 | 3 | 2 | 1 |
|---|---|---|---|---|---|---|---|
| 1 | 0 | 1 | 0 | 0 | 1 | 0 | 1 |
| ATTRIBUTE | | MARKER | | | | | |

There has thus been shown an arrangement for protecting a given location, or field, in a memory corresponding to a given location on the faceplate of a CRT in a computer controlled video display terminal for preventing the changing or erasing of the information displayed thereon. Unused bits in attribute bytes stored in an attribute RAM are used to designate selected areas within a video display character RAM for limiting access thereto, which locations in the character RAM consequently may not be written into and are thus protected from alteration and erasure.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A memory protection system for use in a terminal controlled by a signal processor and including a video display, said system comprising:

first memory means having a plurality of first memory areas accessed by respective memory addresses for storing data therein;

a first data bus coupling said signal processor to said first memory means for permitting said signal processor to write data into said first memory areas and to read data therefrom;

a second data bus coupling said first memory means to said video display for providing the data read from said first memory means to said video display for display thereon; and second memory means coupled to said signal processor by means of said first data bus and to said video display, said second memory means having a plurality of second memory areas each corresponding to a respective first memory area of said first memory means and having stored therein one of a plurality of display attribute words, wherein said display attribute words are read by said signal processor and provided to said video display and to said first memory means for controlling the display of said data on the video display and wherein each of said display attribute words includes a memory protect portion for inhibiting said signal processor from writing data into a first memory area corresponding to a second memory area associated with said display attribute word.

2. The memory protection system of claim 1 wherein said display attribute words are comprised of M bits with each bit representing one of N different display attributes and wherein M>N.

3. The memory protection system of claim 2 wherein said memory protect portion of said display attribute words comprises those bits thereof which do not represent one of said display attributes.

4. The memory protection system of claim 3 wherein N=M−1.

5. The memory protection system of claim 1 further comprising video display control means coupled to said signal processor and to said first and second memory means for writing addresses therein from which addresses said signal processor reads stored data therefrom, wherein each of said addresses provided by said video display control means to said first and second memory means represents a given location on said video display.

6. The memory protection system of claim 5 further comprising address multiplexer means for coupling said signal processor and said video display control means to said first and second memory means in a sequentially alternating manner.

7. The memory protection system of claim 1 further comprising input means coupled to said signal processor for providing user-initiated control signals thereto.

8. The memory protection system of claim 7 further comprising printer means coupled to said signal processor via said first data bus and responsive to the data thereon for providing a printout of the data presented on said video display.

9. The memory protection system of claim 1 wherein said display attribute words include underlining, dimming, reverse video, blinking and blanking functions for controlling the display of said data on the video display.

10. The memory protection system of claim 1 wherein said video display comprises a raster scanned cathode ray tube and wherein corresponding first and second memory areas represent a given location on said cathode ray tube.

11. The memory protection system of claim 1 further comprising a host computer coupled to said signal processor for providing video display control signals thereto.

12. The memory protection system of claim 1 wherein said display attribute words represent visible and invisible display characteristics.

13. The memory protecton system of claim 12 wherein one of said invisible display attribute words controls the positioning of data presented on said video display.

14. The memory protection system of claim 12 wherein one of said invisible display attribute words provides a paragraph scrolling function.

* * * * *